United States Patent [19]
Quicker, Jr.

[11] 3,795,990
[45] Mar. 12, 1974

[54] DRIVER TRAINING APPARATUS

[76] Inventor: Hubert H. Quicker, Jr., 2311 Bartlett Ave., Altoona, Wis. 54720

[22] Filed: July 27, 1971

[21] Appl. No.: 166,358

[52] U.S. Cl. .................................. 35/11, 73/129
[51] Int. Cl. ................................................ G09b 9/04
[58] Field of Search ...... 35/11, 12 F, 12 W; 73/129; 235/95 R, 95 A; 307/10

[56] References Cited
UNITED STATES PATENTS

| | | | |
|---|---|---|---|
| 910,898 | 1/1909 | Bonbright | 235/95 R |
| 2,925,667 | 2/1960 | Fogarty | 35/12 W |
| 2,192,602 | 3/1940 | Meshberg | 73/129 |

*Primary Examiner*—Wm. H. Grieb

[57] ABSTRACT

A driver training apparatus adapted for mounting in a student-driven automobile is connected to receive speed, braking, and other information from the automobile. The apparatus provides reaction- and stopping-distance tests controlled by an automatic random stimuli system. Stopping distances corresponding to selected wet or icy road conditions can be simulated. Other tests indicate braking losses, passing distance, and passing margin-of-safety distance. The control unit which generally houses the distance-indicating meters is operated by the instructor.

11 Claims, 2 Drawing Figures

DRIVER TRAINING APPARATUS

BACKGROUND OF THE INVENTION

The driver training automobile is the single most important object used in the training of the student. A series of devices has been developed providing dual control of certain car functions, such as braking. These devices have made on-the-road training safer and have been generally accepted by the teaching profession.

The present on-the-road training of students is lacking in several respects: It is impossible for the instructor to teach correct braking techniques for wet and icy roads when generally only dry roads are available. The instructor does not have a good means of measuring the student's awareness of driving conditions behind him. In the limited time available for actual driving with the instructor, it is difficult for the student to develop the ability to properly judge safe passing distances.

The invention, as will be described, remedies the above problems, while also providing better methods of measuring reaction and stopping distances.

SUMMARY OF INVENTION

This invention relates to an educational apparatus and more particularly to a distance-measurement device having application in the driver training field.

One object of the invention is an apparatus of the type described which simulates braking and stopping under various road conditions.

Another purpose is a driver training apparatus including means for measuring stopping distance.

Another purpose is a driver training apparatus that teaches the student to be observant of conditions seen through the rear view mirror.

Another purpose is a driver training apparatus including means for measuring reaction distance.

Another object of the invention is an apparatus which aids in the judging of passing distance.

Another purpose is a driver training apparatus including means for measuring braking losses.

Other purposes will appear in the ensuing specification, drawings, and claims.

BRIEF DESCRIPTION OF THE DRAWINGS

The invention is illustrated schematically in the following drawings where.

DESCRIPTION OF THE PREFERRED EMBODIMENT

Figure 1:
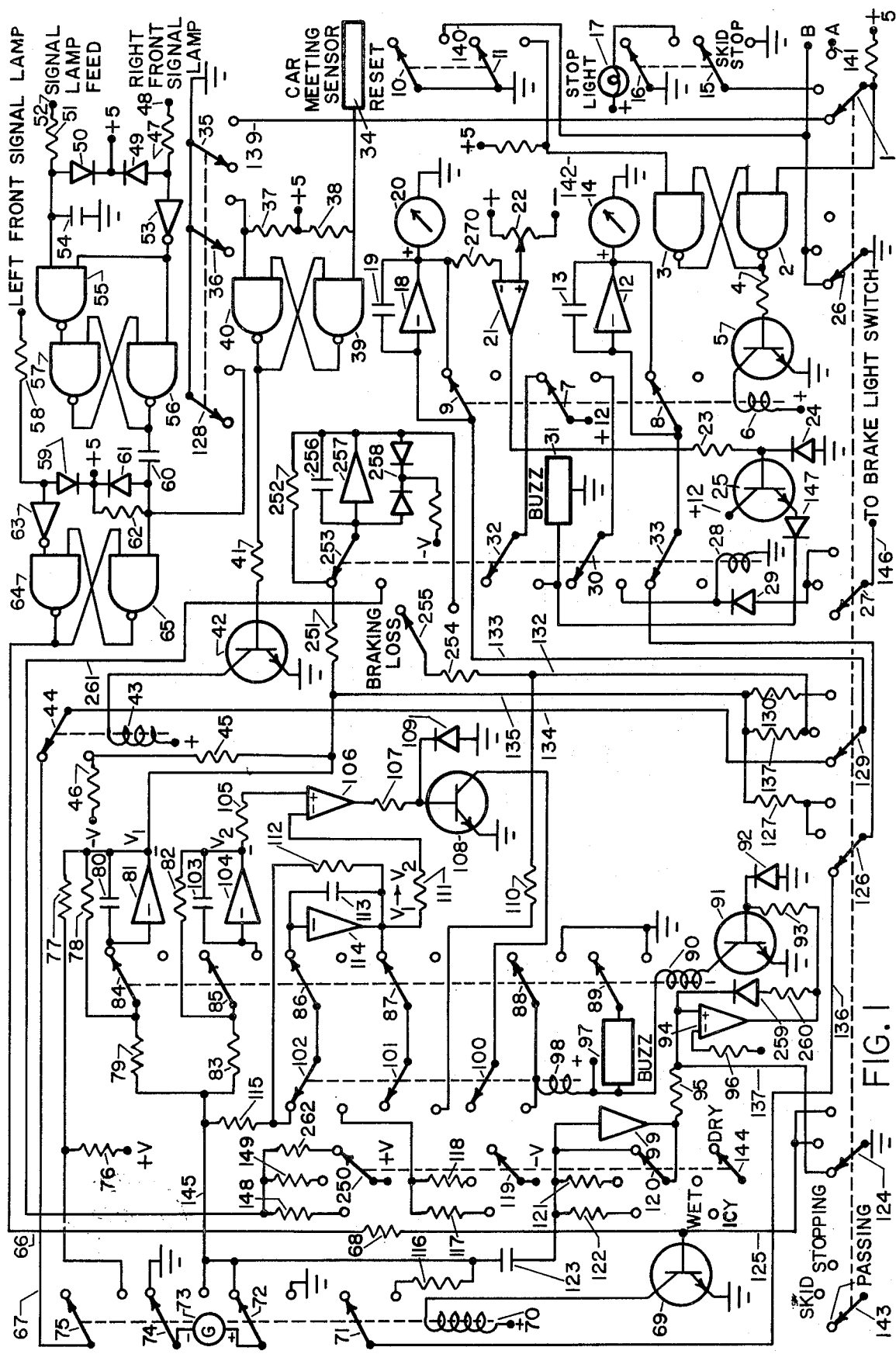
FIG. 1 is a schematic diagram of the distance-measurement circuits.

The Driver Training Apparatus, the main diagram of which is shown in FIG. 1, operates on the principle wherein a voltage proportional to the car's velocity is produced by generator 73, which is connected mechanically to the speedometer cable or other means for providing a rotational movement proportional to speed. The output voltage of said generator, which is representative of the speed of the car, is integrated by operational amplifiers 18 and 12, producing outputs representative of distances at the respective meters 20 and 14. The means by which the inputs of these integrators are connected to the voltage output from generator 73 determines the types of measurements that will be made.

One of the tests performed by this invention is a Stopping-Distance and Reaction-Distance Test in which the student driver must make stopping decisions based upon his knowledge of certain conditions that he sees in his rear view mirror.

The driver education car is equipped with a series of lights placed at the bottom of the rear window in such a position that the student driver may see the lights without their hindering his view through the rear window. Each of the lights placed in the rear window area is a different color. Although the scope of this invention is not intended to be restricted by the number of colors of the lights, four lights—colored red, green, amber, and blue—are used in the present invention. Four smaller lights of the same colors are placed at the top of the dash in such a position that the student will also notice these lights, although they will in no way interfere with his normal driving vision.

A rear light will be automatically and randomly turned on for approximately 40 seconds, after which time another random selection will be made with logically a different-colored bulb being lighted, although since it is a random selection, there is the possibility that the same-colored bulb will be lighted during the next 40 seconds. 35 seconds after the selection of a rear light, one of the front lights on the dash is also turned on by a random-selection means. After 5 seconds, the light on the dash goes out and a new random selection is made of the lights in the back window.

The instructor supervising this test will normally have picked a road or street without much traffic where the car may be safely stopped. The student driver will be driving under normal road conditions where he must be observant of all conditions around him. He is instructed to look often enough into his rear view mirror so that he will be aware of any vehicle behind him and the color of the light that is on in the rear window area. He has also been instructed that if the color of the light going on at the top of the dash is of the same color as the light in the rear window, he should apply his brakes and come to an immediate safe stop. When driving in traffic, the student may be instructed to only tap his brakes. This will still allow operation of the Reaction-Distance Test. If the bulb lighted on the dash is not of the same color, then he should continue on with the normal driving procedure. When the randomly selected dash light is of the same color as the light that has been on for the last 35 seconds in the rear window, the driving apparatus will immediately start the indication of a distance at meter 14. At the instant that the brake is applied, said meter will stop, showing the distance the student drove from the initiation of the stop signal until the brake was applied. Meter 20 will continue to move until the car comes to a complete stop, showing the total stopping distance from the start of the stop signal until the car is actually stopped.

Figure 2:
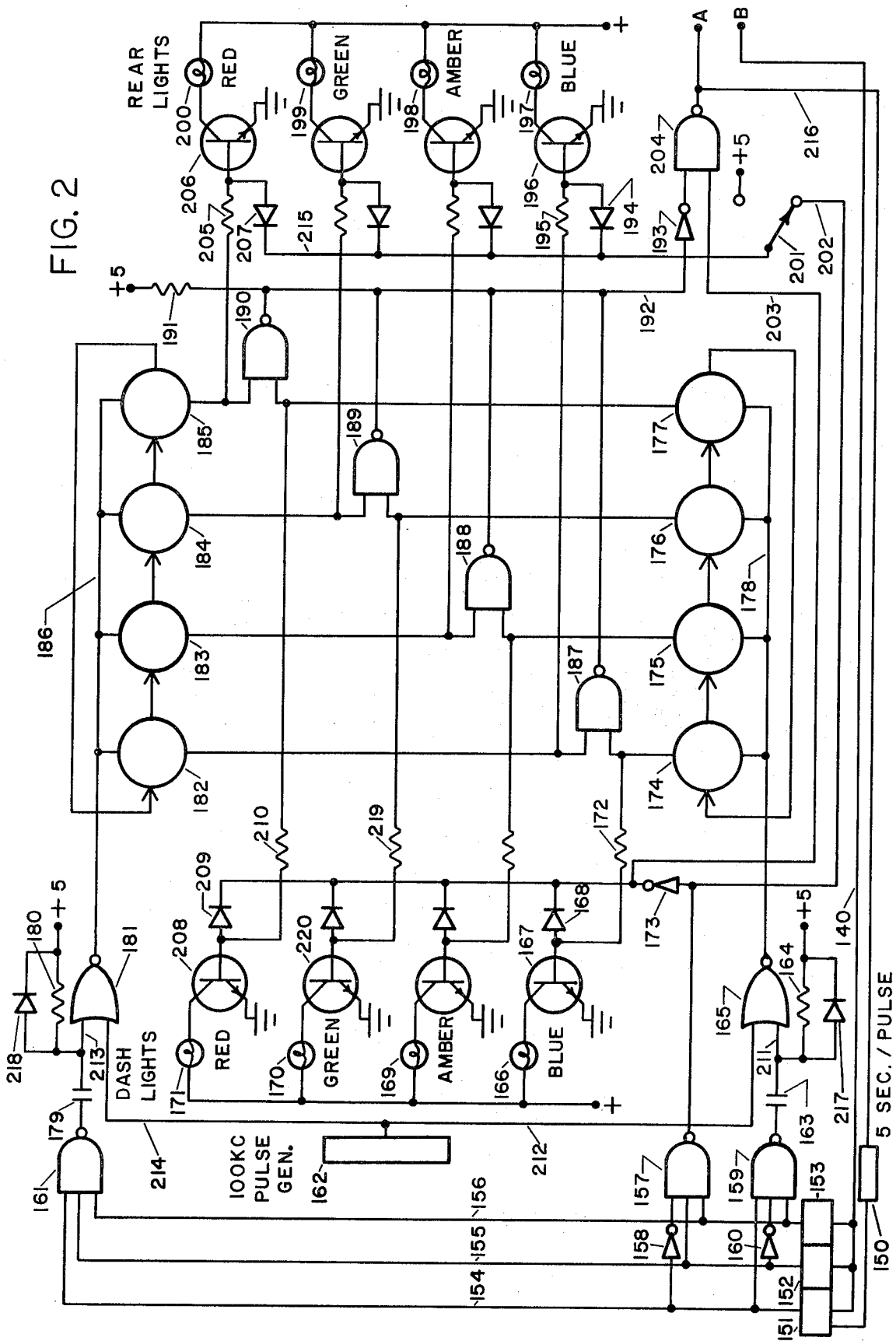
FIG. 2 is a schematic diagram of the timing circuits used in the stopping test.

Referring to FIG. 2, timing pulse generator 150 may consist of a unijunction transistor timing circuit that applies a pulse once every five seconds to a three-bit binary counter consisting of binaries 151, 152, and 153. The outputs of said binaries are, respectively, 154, 155, and 156. Three-input NAND gate 157 has one of its inputs connected to the output of inverter 158. The input of said inverter is connected to the output of binary 151. The other inputs to NAND gate 157 are connected to the outputs of binaries 152 and 153. The output of NAND gate 157 can go low only when its inputs are high; therefore, binary output 154 must be low and binary outputs 155 and 156 must be high. This condition is met as the sixth timing pulse is received at the input to binary 151. Three-input NAND gate 159 has one of its inputs connected to the output of inverter 160. The input of said inverter is connected to the output of binary 152. The other inputs to NAND gate 159 are connected to the outputs of binaries 151 and 153. The output of NAND gate 159 can go low only when its inputs are high; therefore, binary outputs 154 and 156 must be high and binary output 155 must be low. This condition is met as the fifth timing pulse is received at the input to binary 151.

Three-input NAND gate 161 has its inputs connected to the outputs of binaries 151, 152, and 153. Therefore, its output goes low only when binary outputs 154, 155, and 156 are high. This condition is met as the seventh timing pulse is received at the input to binary 151.

Pulse generator 162 may also consist of a unijunction transistor circuit and is so designed that its output goes low at the rate of approximately 100 kilocycles per second. This output is applied to input 212 of NOR gate 165 and input 214 of NOR gate 181. Inputs 211 and 213 of NOR gates 165 and 181 are normally held high by their respective resistors 164 and 180 to plus 5 volts. Therefore, the outputs of NOR gates 165 and 181 are normally held low. Output 178 of NOR gate 165 is connected to the input of elements 174, 175, 176, and 177. Each of said elements may consist of a flip-flop circuit, with these circuits being inter-connected to form a ring counter. Output 186 of NOR gate 181 is connected to the inputs of elements 182, 183, 184, and 185, which form a second ring counter.

Each of these ring counters is so designed that only one element at a time can be on, with its output being high. The high output will travel around the ring of elements one step at a time for each positive input pulse in its input circuit.

At the start of the test the reset switch shown in FIG. 1 is depressed, arm 10 grounds connector 140, setting outputs of each of the three binaries to the low condition.

The two ring counters are not affected by operation of the reset switch; therefore, the same output of each ring counter which was high before the resetting action will remain high. If the output of element 185 is high, current passing through resistor 205 will attempt to drive transistor 206 into saturation, thereby turning on rear light 200. As output 202 of NAND gate 157 remains high until the sixth timing pulse enters binary 151, line 215 connected via switch 201 will be held high. Line 215 is connected to the base of each of the rear-light transistors via germanium diodes, such as 194 and 207. If line 215 is switched to a low level, each diode will clamp the voltage at the base of its corresponding transistor, thereby preventing the switching-on of said transistor and the light in series with it. However, line 215 is held high and the high output of element 185 is therefore able to turn on transistor 206 and light 200, which is the rear red light.

The output of element 174 of the other ring counter may also be high, sending current through resistor 172 to the base of transistor 167. However, the high output of NAND gate 157 is inverted by inverter 173, providing a low level which, via germanium diode 168, clamps the voltage at the base of transistor 167, thereby holding off said transistor and light 166, which is the blue light on the dash.

After timing pulse generator 150 has pulsed five times, the output of NAND gate 159 goes low. Capacitor 163 connects the output of NAND gate 159 to input 211 of NOR gate 165 and momentarily drives said input low. After a given period, resistor 164 charges capacitor 163, thereby returning input 211 of NOR gate 165 to the high condition. While said input was low, input 212 of NOR gate 165 was pulsing high and low at the rate of 100 kilocycles per second by pulse generator 162. The output of NOR gate 165 follows the pulsing input going high, then low, as the input goes low, then high. Each time the output of said NOR gate goes high, it transfers the conduction state from one of the elements in the ring counter to the next corresponding element. The time constant of capacitor 163 and resistor 164 are such that approximately two pulses are passed through NOR gate 165, triggering the ring counter made up of elements 174, 175, 176, and 177. If pulse generator 162 is on the verge of supplying a pulse to the input of NOR gate 165 when capacitor 163 pulls the other input to NOR gate 165 low, three pulses will be permitted to pass through NOR gate 165 before resistor 164 again brings the input of NOR gate 165 high. Therefore, the output pulses of NOR gate 165 drive the ring counter a random number of steps.

Although it takes only about 20 microseconds for input 211 of NOR gate 165 to go high, thereby cutting off the flow of pulses through said NOR gate, the output of NAND gate 159 remains low until the next timing pulse enters the input of binary 151 five seconds later. As the output of NAND gate 159 goes high it would, due to the charge across the capacitor, drive input 211 higher than plus 5 volts; therefore, diode 217 is used to clamp input 211 to a safe value, thereby preventing the possibility of a break-down at the input of NOR gate 165. The timing pulse that has just taken place, being the sixth pulse in the series, causes the output of NAND gate 157 to go low. This output, upon passing through inverter 173, presents a high condition to the diodes, such as 168 and 209, thereby unclamping their corresponding transistors and allowing the ring counter output that is presently high to turn on its corresponding transistor and light.

The outputs of elements 174 and 182, which control the blue lights, are connected to the inputs of open collector NAND gate 187. Likewise, outputs of the elements controlling the amber, green, and red lights are connected respectively to open collector NAND gates 188, 189, and 190. By design, only one output of each ring counter can be high at any given moment. Also, the output of any of the open collector NAND gates can be low only if both inputs to said NAND gate are high. Therefore, a low output of one of said NAND gates signifies that elements controlling the same colors are on in each ring counter. The outputs of open collector NAND gates 187, 188, 189, and 190 are connected by line 192 to load resistor 191. If all NAND gate outputs are high, no current will be drawn through resistor 191, and output 192 will be high. Output 192 will be low if ring counter elements controlling the same-colored lights are on in each of said ring counters. Output 192 is inverted by inverter 193, placing a high input at NAND gate 204 if and only if ring counter elements controlling the same-colored lights are on.

Prior to the sixth timing pulse, the output of NAND gate 157 is high and output 203 of inverter 173 will be low, holding output 141 of NAND gate 204 high regardless of the input from inverter 193.

As described above, several high pulses were injected into the ring counter via line 178 after the fifth timing pulse. Two pulses would have moved the high output from element 174 to element 176. Current through resistor 219 is held low at the base of transistor 220 by the previously described clamping action. When the sixth timing pulse takes place, the output of NAND gate 157 goes low, thereby allowing green dash light 170 to be lighted. Since the red rear light is on, the output of 193 is low, output 141 of NAND gate 204 remains high, and the student does not apply his brakes.

It is noted that the switching low of output 202 of NAND gate 157 upon passing through switch 201 places a low on line 215. This then clamps the bases of all rear-light transistors, thereby turning off the rear light that was on. This prevents the student from checking the color of the rear light once the dash light has lighted. If the instructor desires, switch 201 is moved to its alternate position, applying plus 5 volts to line 215, thereby allowing the rear light to remain on during thee entire cycle.

Five seconds later the seventh timing pulse enters binary 151, causing outputs 154, 155, and 156 to all go high. Output 202 of NAND gate 157 goes high, turning off the dash light, applying a low input to NAND gate 204, and unclamping the rear-light transistor inputs if switch 201 is positioned to connect line 215 to output 202. The output of NAND gate 161 goes low, providing via capacitor 179 a momentary low condition at input 213 of NOR gate 181. While input 213 is low, pulses at input 214 allow the generation of inverted pulses at output 186 of NOR gate 181. These pulses then trigger the rear-light ring counter consisting of elements 182, 183, 184, and 185. The time constant of capacitor 179 and resistor 180 is such that only one or two pulses will pass through NOR gate 181 before the rising voltage on input 213 will prohibit further pulses from passing through said NOR gate. If pulse generator 162 had generated a pulse just before the output of NAND gate 161 went low, it is likely that only one pulse would have passed through NOR gate 181 and the conduction state would have passed from element 185 to element 182. The output of the latter element, being high, then applies a current through resistor 195 to the base of transistor 196, which upon conducting turns on blue rear light 197.

Five seconds later the eighth timing pulse returns the outputs of the three binary counters to the low condition and the next cycle starts. After five timing pulses, the output of NAND gate 159 again goes low. If input 211 remains low for the passage of two pulses, the conducting element of the dash-light ring counter will shift from element 176 to element 174. At this time there will be a high condition at the outputs of elements 174 and 182. As these outputs supply both inputs of open collector NAND gate 187 with a high condition, the output will draw current through load resistor 191, thereby lowering line 192. The low on line 192 upon passing through inverter 193 presents a high to NAND gate 204. However, the low condition presented by line 203 to the other input of NAND gate 204 maintains the output of said NAND gate at a high level.

Five seconds later the sixth timing pulse allows output 202 of NAND gate 157 to go low. Said low output upon passing through inverter 173 presents a high to the dash-light clamping diodes, thereby allowing the blue dash light to be lighted. Output 203 of inverter 173 also presents a second high input to NAND gate 204, thereby driving its output 141 low. Line 141 of FIG. 2 is connected at point A to line 141 of FIG. 1. As the stopping test is in operation, the main function switch 143 will be in the "stopping" position and switch contact 1 will contact line 141, placing a low at the input of NAND gate 2, whose output then goes high, placing a high on one input of NAND gate 3. As other input 142 is held high through a resistor to plus 5 volts, the output of NAND gate 3 goes low, placing a second low input to NAND gate 2, thereby insuring that its output will remain high. The high output of NAND gate 2 via resistor 4 turns on transistor 5, energizing relay 6 and starting the distance measurement.

It is noted that the output of NAND gate 204 is conducted via line 216 to an input of the timing pulse generator 150. A low on this line prevents the generation of pulses by said generator, thereby stopping the timing sequence until the reset switch is again depressed.

In describing the operation of the Stopping Test, the road-condition switch 144 is placed in the "dry" position. Contact 120 of said stopping switch shorts the feedback path of operational amplifier 99, which then prevents relay windings 90 and 98 from energizing, as will be explained later. Contact 124 of the main function switch being in the "stopping" position grounds the base of transistor 69, thereby preventing the energizing of relay winding 70.

Generator 73 is a tachometer-type DC generator and is mechanically connected to the driver education car so as to produce a voltage proportional to the speed of said car. The minus terminal of generator 73 is grounded via relay contact 74. The other terminal of said generator provides a positive output through relay contact 72 to main speed voltage line 145. With the main function switch in the "stopping" position and the road condition switch on "dry," resistor 79 provides the only significant path for the speed voltage output. Relay contact 84 remains in the closed position during the entire test; therefore, resistors 78 and 79 and operational amplifier 81 form a voltage inverter circuit. Resistors 78 and 79 are chosen so that output 135 of amplifier 81 will be equal to but of opposite polarity to the voltage at line 145. Capacitor 80, which parallels resistor 78, provides such a high impedance to normal changes in the speed voltages that its effect upon the circuit is not significant.

The negative speed voltage is fed via line 135, through resistor 130, switch contact 129, and line 133, to the input of operational amplifier 18. Amplifier 18, resistor 130, and capacitor 19 form an integrator with its output voltage representing a distance traveled by the car. The time constant of resistor 130 and capacitor 19 is selected to correspond with a distance scale of meter 20, which is connected to the output of amplifier 18.

The negative speed voltage on line 135 is also fed through resistor 127, switch contact 126, and relay contact 33, to the input of operational amplifier 12. Said amplifier, resistor 127, and feedback capacitor 13 form an integrator whose output is representative of a distance traveled by the car. The time constant of resistor 127 and capacitor 13 is selected to correspond with a distance scale of meter 14, which is connected to the output of amplifier 12.

Relay contacts 8 and 9 provide a direct connection between the inputs and outputs of their corresponding amplifiers, thereby holding the outputs of amplifiers 12 and 18 at zero. Line 146 is connected between the brake-light switch of the car and contact 27 of the main function switch. When the brakes are applied, plus 12 volts is applied to line 146, through switch contact 27, diode 29, and through relay winding 28 to ground. With winding 28 energized, relay contacts 30, 32, 33, and 253 move to their lower position. If the student applies his brakes before the distance measurement is started by the energizing of relay winding 6, the plus 12 volts at contact 7 will pass through contact 32, causing buzzer 31 to operate. The instructor will be able to judge if the student were justified in using the brakes or if he merely jumped the gun upon seeing the wrong-colored light. It is noted that the plus 12 volts is blocked by diode 147, which protects transistor 25.

When the color of the dash light is the same as the light in back, relay winding 6 is energized, switching contacts 7, 8, and 9. Contact 9 opens, removing the short circuit across amplifier 18. Said amplifier immediately starts to integrate the speed voltage at the input of resistor 130, with meter 20 reading the instantaneous distance the car has traveled since the energizing of winding 6. Contact 8 opens, causing the same action in amplifier 12 circuit, with meter 14 reading the same distance. Contact 7 switches, applying plus 12 volts to contact 30. When the student applies his brake and winding 28 is energized, contact 30 closes, supplying plus 12 volts to winding 28, thereby holding relay 28 closed even after the brakes are released. Diode 29 blocks the plus 12 from feeding back into the brake-light circuit. Contact 33 opens, disconnecting the input of amplifier 12 from the speed voltage circuit. Without an input signal, the amplifier 12 and feedback capacitor 13 combination holds the output of said amplifier at a constant level, thereby providing meter 14 with a constant voltage representative of the distance the car traveled from the time a dash light having the same color as the light in the rear window turned on until the brakes were depressed. Relay contacts 32 and 253 also switch but have no effect upon the stopping test. Amplifier 18 will continue to integrate the speed voltage at the input of resistor 130 until said speed voltage becomes zero, signifying that the car has stopped. The output of amplifier 18 will then provide meter 20 with a voltage representative of the total distance traveled by the car from the moment the stopping stimulus appeared until the car was stopped.

After the reaction and stopping distances are noted, the instructor may depress the reset switch, consisting of contacts 10 and 11, momentarily grounding lines 140 and 142. Grounding line 140 resets, as previously described, the light selection and timing circuit shown in FIG. 2. Grounding input 142 of NAND gate 3 causes its output to present a high input to NAND gate 2. Since the outputs oof the three binaries become low on being reset, the output of NAND 157 goes high, output 203 of inverter 173 goes low, forcing output 141 of NAND gate 204 to go high. Upon passing through contact 1, said output provides NAND gate 2 with a second high input, thereby causing thee output of NAND gate 2 to go low, turning off transistor 5 and winding 6. Contacts 8 and 9 close, resetting the outputs of corresponding amplifiers 12 and 18 to zero. Contact 7 rises, braking the holding circuit of relay winding 28, which then returns its contacts to normal, allowing the next test to begin.

The second type of test that can be performed by the driver training apparatus is a test that simulates stopping distances under wet and icy road conditions. Thhe maximum rate of deceleration that can be developed by a car's braking system is dependent mainly upon the frictional force that can be applied between the car's tires and the surface of the road without skidding. If one were to rate the maximum stopping deceleration on a dry surface at 100 percent, one might rate the maximum non-skid deceleration on a wet surface at approximately 70 percent and the maximum non-skid deceleration on an icy surface at approximately 40 percent of the car's maximum usable deceleration. The present invention uses a differentiating circuit in combination with a voltage comparator circuit to determine if the selected deceleration, representing a wet or icy roadway, is exceeded. Since the car is being stopped on a dry roadway, its actual stopping characteristics will depart from wet or icy stopping characteristics if the selected deceleration is exceeded. However, the stopping distances for lesser decelerations are not affected by stopping on a dry roadway.

The following example illustrates both the problem and the solution as provided by the invention. A car with good brakes can stop on a dry concrete surface at a maximum deceleration of about 20 ft./sec.$^2$. A maximum decleration of 14 ft./sec.$^2$ is chosen for braking on a wet surface. It is desired to show the wet surface stopping distance for a car traveling 90 ft./sec. or 61.4 miles/hour. The student slows the car from 90 ft./sec. to 70 ft./sec. at a deceleration rate of from 10 ft./sec.$^2$ to 13.9 ft./sec.$^2$. At 70 ft./sec. his deceleration increases to 14 ft./sec.$^2$ and higher. At the 14 ft./sec.$^2$ level, a deceleration rate circuit provides an audible warning that the car is theoretically skidding. At 40 ft./sec. the deceleration drops below the 14 ft./sec.$^2$ and the car completes the remaining stopping distance at a lesser deceleration.

An integration of the car's speed between 90 ft./sec. and 70 ft./sec. would provide an accurate slowing-down distance for a wet or dry road. Integration of the car's speed between 70 ft./sec. and 40 ft./sec. provides an accurate distance for a dry stop; however, were the same deceleration applied on a wet surface, the car would be skidding at approximately 70 ft./sec. for the time interval in which the car actually went from 70 ft./sec. to 40 ft./sec. To arrive at a realistic wet stopping distance, a distance equal to the skidding distance and the distance the car would travel while slowing from 70 ft./sec. to 40 ft./sec. while maintaining a deceleration of less than 14 ft./sec.$^2$ must be included in the total distance. Lastly, the integration of the car's slowing-down speed from 40 ft./sec. to a stop produces the actual distance traveled by a car on either a wet or dry roadway, since the deceleration didn't exceed the 14 ft./sec.$^2$ maximum chosen for a wet road surface.

The main function switch 143 is set at the skid position, and the road condition switch 144 is positioned to select the type of road surface desired. Contact 124 of the main function switch grounds the base of transistor 69, thereby preventing the energizing of relay winding 70. Contact 26 of the same switch grounds the reset terminal of the three binaries, thereby disabling the light and timing circuit of FIG. 2. Contact 1, also of the main function switch, connects the switching circuit, controlling winding 6 to contact 15 of the skid-stop switch.

Line 145 provides capacitor 123 with a positive voltage proportional to the car's speed. Capacitor 123, operational amplifier 99, and resistor 121 connected, via switch contact 120, across said amplifier form a differentiator withh its output representing the acceleration or deceleration of the car. The time constant of resistor 121 and capacitor 123 is selected so that the output of amplifier 99 will equal plus 5 volts when the deceleration of the car equals 14 ft./sec.$^2$. The output of amplifier 99 is connected via current-limiting resistor 95 to the non-inverting input of operational amplifier 94. A reference voltage of plus 5 volts is applied to the inverting input of said amplifier through current-limiting resistor 96. The output of amplifier 94 will normally be at minus 13 volts as it is driven to the minus saturation voltage by the plus 5 volts applied to the inverting input of said amplifier. This output is connected via resistor 93 to transistor 91, which is protected from the large reverse bias by diode 92. If the output of amplifier 99 becomes greater than plus 5 volts, signifying a deceleration greater than 14 ft./sec.$^2$, then the inverting input to operational amplifier 94 becomes negative with respect to its non-inverting input. This drives the output of amplifier 94 into a positive saturation of about plus 13 volts, which allows transistor 91 to conduct, thereby energizing relay winding 90.

At the start of the skid test the student is advised as to the condition of the road surface. He is instructed to cautiously feel out the maximum braking permitted without skidding and to stop the car in as short a distance as is possible. The instructor, after carefully checking traffic conditions, depresses the skid-stop switch which momentarily lights lamp 17 via switch contact 16 to ground, thereby signaling the start of the test. A low is also conducted through switch contact 15 and function switch contact 1 to an input of NAND gate 2, thereby energizing relay winding 6. Relay contact 7 conducts plus 12 volts to relay contact 30, while relay contact 8 opens, allowing the normal operation of the reaction-distance circuit, as has been previously described. Relay contact 9 also opens, allowing amplifier 18 to integrate the voltage proportional to the car's speed, producing an output representative of the instantaneous distance the car has traveled since the opening of said contacts. The student upon seeing lamp 17 lighted applies his brakes, thereby engaging winding 28, as has been earlier described. Relay contact 253 switches; however, in the normal skid test, braking-loss switch 255 is open, preventing the switching of said contact from having any effect upon the circuit. Relay contact 33 opens, providing the reaction distance, as has been described, while contact 30 closes, allowing holding relay winding 28 to remain energized after the braking has stopped. Until a simulated skid condition occurs, the operation of amplifier 18 and its circuit is the same as previously described in the stopping test. It is noted that resistor 131 instead of resistor 130 is the input resistor of the integrator circuit. As stopping distances are generally greater on wet and icy roads, the different time constant formed by resistor 131 and capacitor 19 permits use of a different scale on meter 20.

The voltage representing the speed of the car is conducted from line 145 through resistor 115 and relay contacts 102 and 86 to the input of operational amplifier 114. The amplifier's output is connected via resistor 112 back to the junction of resistor 115 and relay contact 102, forming a voltage inverter when contacts 102 and 86 are in their normal position. Resistors 112 and 115 are chosen so that the output of amplifier 114 will be equal to but of opposite polarity to the speed voltage at line 145. Capacitor 113 which parallels amplifier 114 provides such a high impedance to changes in the speed voltages that its effect upon the circuit is not significant. Since the output of amplifier 114 passes through relay contact 87 to the open relay contact 101, this circuit has no effect upon the other circuits under normal conditions.

If the student brakes hard enough to cause the rate of deceleration to exceed the 14 ft./sec.$^2$ rate allowed by setting the road condition switch 120 to its "wet" position, relay winding 90 is energized, as described above. Relay contact 89 closes, with buzzer 97 audibly alerting the student that the car is skidding. Relay contact 88 closes, energizing relay winding 98, thereby ensuring that all the contacts of relay windings 90 and 98 will be in their downward position while the car is skidding. Relay contact 84 opens, disconnecting the resistor input and feedback paths from the input of amplifier 81. Without an input signal, the amplifier 81 and feedback capacitor 80 combination holds the output voltage of said amplifier at its instantaneous value when contact 84 is opened. This circuit then provides the stopping distance integrator circuit of amplifier 18 with a fixed speed voltage equal to the speed of the car while skidding. This voltage will be integrated by said circuit during the duration of the simulated skid, with the distance indicated by meter 20 increasing an amount equal to the distance of the skid. If it is desirable to provide a slight slow-down during the skid, a high value resistance (not shown) could be placed across capacitor 80.

Relay contact 85 closes, forming a voltage inverter circuit, with input resistor 83 conducting the speed voltage from line 145 to the input of operational amplifier 104 while resistor 82 provides the feedback from the output to the input of said amplifier. Resistors 82 and 83 are chosen so that the output of amplifier 104 will be equal to but of opposite polarity to the speed voltage at line 145. Capacitor 103 parallels amplifier 104 but has a high enough impedance that its effect upon the circuit is not significant. Relay contacts 86 and 102 switch to their lower positions, opening the input of amplifier 114 and holding the output of said amplifier at the instantaneous speed voltage at the start of the skid. Relay contacts 87 and 101 also switch to the downward position without any effect on the circuit.

At the instant the simulated skid started, switching the above-mentioned relay contacts, the outputs of amplifiers 104 and 114 were at a negative voltage equal to the instantaneous speed of the car when it started to skid. Amplifier 114 with open input holds constant said voltage, which for example might be minus 4 volts, during the skid period. This output is conducted via current-limiting resistor 111 to the inverting input of operational amplifier 106, which is used as a voltage comparator. Amplifier 104 has an active input through closed relay contact 85; therefore, its output follows the car's speed voltage during the skid. Said output is applied via current-limiting resistor 105 to the non-inverting input of amplifier 106.

In order to end the car's skidding, its deceleration must become somewhat less than 14 ft./sec.$^2$, since sliding friction is less than rolling friction. For this example, a drop in deceleration to 11 ft./sec.$^2$ is required to stop the car's skidding. A deceleration of 11 ft./sec.$^2$ provides approximately plus 4 volts at the output of amplifier 99; therefore, a plus-1-volt equivalent of positive feedback must be supplied by the flow of current through resistor 260 and diode 259. Said diode prevents the flow of feedback current when the amplifier's output is negative.

As the car's deceleration drops to the 11 ft./sec.$^2$ level, the output of amplifier 94 switches from positive to negative, with transistor 91 stopping the flow of current through winding 90. The opening of relay contact 85 disconnects the input of amplifier 104, holding its output at a negative voltage equal to the instantaneous speed of the car at the end of the skid which, for example, might be minus 3 volts. With minus 4 volts at the inverting input and minus 3 volts at the non-inverting input of amplifier 106, the output will be at a positive saturation voltage of around plus 13 volts, which is connected via resistor 107 to the base of transistor 108, thereby turning on said transistor. During the simulated skidding condition, relay contact 100 is closed, providing, while transistor 108 is conducting, a second path for the current through relay winding 98 to reach ground. Therefore, the opening of relay contact 88 does not terminate the current through relay winding 98. The opening of relay contact 89 stops the audible signal, thereby indicating that the car is no longer skidding.

The closing of relay contact 86 completes the path for a negative reference voltage through switch contact 119, resistor 118, and relay contacts 102 and 86, to the input of amplifier 114. Resistor 118, amplifier 114, and feedback capacitor 113 form an integrating circuit whose initial output represents the initial speed voltage of the car at the start of the simulated skid. The negative reference voltage represents a deceleration which upon being integrated reduces the speed voltage output of amplifier 114. Resistor 118 can be selected to form with capacitor 113 the proper time constant to produce a 12 ft./sec.$^2$ deceleration rate of change in the speed voltage output of amplifier 114. When the output of amplifier 114 drops to a value equal to the car's speed voltage at the termination of the simulated skid, which is held at the output of amplifier 104, voltage comparator 106—which compares the outputs of amplifiers 104 and 114—switches its output from plus 13 volts to minus 13 volts, turning off transistor 108 and relay winding 98, since contact 88 is already open. While relay winding 98 is energized, integration of the speed voltage is accomplished by conduction of the output voltage of amplifier 114 through relay contact 87—which closed at the end of the skid—and through relay contact 101, resistor 110, line 132, main function switch contact 129, and line 133 to the input of amplifier 18. Resistor 110 is chosen to provide the proper time constant with capacitor 19 so that the stopping distance as shown on meter 20 will increase an amount equal to the distance the car would travel in slowing from its initial to its final simulated skid speed at a deceleration rate of 12 ft./sec.$^2$. The deceleration rate of 12 ft./sec.$^2$ was selected as a realistic average rate of deceleration, although any rate below the skid rate of 14 ft./sec.$^2$ could be used.

At the end of the simulated skid, relay contact 84 closes, with the output of amplifier 81 returning immediately, for all practical purposes, to the car's actual speed voltage. The car may then decelerate at a rate of less than 14 ft./sec.$^2$ to a complete stop, with the integrator circuit of amplifier 18 providing an increase in output voltage proportional to the actual distance the car traveled after the skid. If the deceleration limit is again exceeded, a second skid cycle occurs, with the operations previously described taking place.

The indicated skid distance of a single skid stop has the following components: the integration of the car's actual slowing-down speed from the start of the test to the start of the simulated skid; the integration of the car's instantaneous speed at the start of the simulated skid for the period of the skid; the integration of the car's slowing-down from its actual speed at the start of the simulated skid to the car's actual speed at the finish of the simulated skid at a programmed deceleration rate less than the skid rate; and the integration of the car's actual slowing-down speed, starting at the end of the simulated skid, until said speed becomes zero as the car stops.

The last two components of the simulated stopping distance operate concurrently, with amplifier 18 integrating the sum of the two speed voltages during the period of overlap.

A simulated skid will usually last only a fraction of a second, as the student will normally stop braking as soon as he hears the buzzer. Therefore, the car's actual change in speed during said simulated skid will not be very great; however, the time required for decreasing the speed voltage from the car's actual speed at the start of said skid to the car's actual speed at the end of the skid at the programmed deceleration rate of 12 ft./sec.$^2$ may take about a second. If a second simulated skid occurs before the above slowdown is finalized (i.e., if relay winding 90 is energized before winding 98 is turned off), an error will be introduced into the skid stopping distance. This is prevented by greatly reducing the time of slowing from the initial to the final skid speed while still producing the same increase in distance at meter 20.

The distance a car moves while slowing from one speed to another is inversely proportional to the car's average deceleration, as shown by the following formula:

$$\text{distance} = \frac{\text{initial velocity}^2 - \text{final velocity}^2}{2 \times \text{deceleration (ave.)}}$$

If the deceleration is multiplied by 10 (i.e., the value of resistor 118 is decreased to provide a deceleration of 120 ft./sec.$^2$) the distance after integration will be one-tenth of the actual distance. However, by decreasing the input resistor 110 of the integrator circuit to one-tenth of its original value, that portion of the output of amplifier 18 which is due to integration of the speed voltage at the output of amplifier 114 will be multiplied by 10. Thus, the correct distance will be added to meter 20. Since the deceleration rate has been increased by a factor of 10, the time required to drop from the initial to the final skid speed will be cut by ten and the operation can be completed before the next skid occurs.

A variation in the skid test is made by subtracting from the total stopping distance the shortest possible distance in which the car can be stopped; i.e., the stopping distance if one could brake at the maximum non-skid deceleration for the entire stopping period. The difference in distances represents losses due to skidding and braking at less than the maximum deceleration rate.

This test is made by closing braking-loss switch 255, then running a normal skid test. When relay contact 253 is in its upward position, resistors 251 and 252 form respectively the input and feedback resistors to operational amplifier 257, forming a voltage inverter circuit. Resistors 251 and 252 are chosen so that the output of amplifier 257 will be equal to the minus speed voltage on line 135 but will be of opposite polarity. Capacitor 256 which parallels amplifier 257 has no significant effects upon the voltage inverter circuit. The output of amplifier 257 is connected through braking-loss switch 255, resistor 254, line 132, main function switch contact 129, and line 133 to the input of amplifier 18. Resistor 254 is made equal to resistor 131, which is the input resistor for the negative speed voltage.

When the test is started by the energizing of relay winding 6, the plus and minus speed voltages, which are by design equal, are conducted to the input of amplifier 18 through equal resistors. Therefore, the signals cancel, causing no reaction distance voltage to be developed at the output of amplifier 18. When the brake is engaged, relay winding 28 is energized, switching all its contacts to the lower position. Relay contact 253 switches, connecting the input of amplifier 257 via line 261 to a resistor selected by contact 250 of the road condition switch. When the road condition switch 144 is set to the "wet" position, the positive reference voltage supplies a current through resistor 149 to the input of amplifier 257. Input resistor 149, amplifier 257, and feedback capacitor 256 form an integrating circuit whose output is a voltage representative of speed. At the instant that relay contact 253 was switched, the output of amplifier 257 was a plus voltage equal to the car's speed at the start of braking; however, the positive reference voltage conducted through resistor 149 forms a deceleration equal to 13.9 ft./sec.$^2$, which upon being integrated reduces the speed voltage at the output of amplifier 257 at a rate equal to the hardest non-skid braking possible. When the output of amplifier 257 reaches zero, signifying that the car has stopped, clamping circuit 258 prevents the output from ever going negative. The positive output of amplifier 257 upon being integrated by amplifier 18 subtracts a distance equal to the shortest possible stopping distance from the total braking distance, which has been produced by other previously discussed circuits. The distance shown by meter 14 then indicates losses due to imperfect braking.

Although only the wet road condition was described, the same principles apply for icy and dry conditions as long as the proper values of resistors are used for each test. Note that the skid feature is disabled on dry roads.

After the car has stopped during a skid test, the reaction distance is noted, as is the total stopping distance or braking-loss distance. The circuits of the invention may then be reset by depressing the reset switch, as has been previously described. The next test using the same or different road conditions may then be performed.

The third type of test that can be performed by the driver training apparatus is the passing test. The main function switch 143 is moved to its "passing" position. The student is following a car, commonly referred to as car No. 2. The student and instructor note an oncoming car, commonly referred to as car No. 3, at a distance that they believe is sufficient for passing. The student is instructed to note the distance of the oncoming auto as the instructor depresses the start-passing switch. After car No. 3 has passed by and a long, clear stretch of road is open, the student is instructed to pass car No. 2 at a normal rate of speed. He is also instructed to use his left signal light as he moves out of the right-hand lane and his right-signal light as he pulls back into his lane. Once he is safely back in his own lane, he turns off his right signal light, ending the test. Meter 20 then indicates the distance which would have been present between cars No. 1 and No. 3 at the end of passing, had the student actually passed car No. 2 when the instructor started the passing test. It is assumed that the student would have taken the same distance to pass as he later actually took in passing car No. 2. If the distance between cars No. 1 and No. 3, commonly referred to as the margin of safety, becomes zero while the student is in the process of passing, an audible warning is sounded, signifying that he would have had a collision with car No. 3. Meter 14 indicates the distance required in the passing of car No. 2.

When the instructor depresses the start-passing switch, the apparatus starts to calculate the distance the student's car is traveling. Assigning an average speed to car No. 3, the apparatus also starts calculating the distance traveled by car No. 3. The distances are completed when a device sensing that car No. 3 has passed by car No. 1 immediately stops the calculation of the two distances. Said distances are added, giving the approximate distance between the two cars at the start of the test. When the student pulls out to pass, his signaling starts the calculation of the distance traveled by car No. 1 in passing and the distance traveled by car No. 3, using the same above-mentioned average speed, during the time car No. 1 is passing. These two distances are subtracted from the previous distance, with the difference equalling the approximate margin of safety in passing.

The following mathematical relationships illustrate what conditions must be met to provide a safe though perhaps conservative margin of safety.

Initial distance − Passing distance = margin of safety distance

Initial distance = Time$_1$ × ave. velocity of car 1 + Time$_1$ × velocity of car 3 with Time$_1$ representing the time from the start of the passing test to the time car No. 3 passes by.

Passing distance = Time$_2$ × ave. velocity of car 1 (passing) + Time$_2$ × velocity of car 3 with Time$_2$ representing the actual passing time.

In combining the three equations, using abreviations:

$$T_1 \times V_{car_1} + T_1 \times V_{car_3} - T_2 \times V_{car_{1(pass)}} - T_2 \times V_{car_3} = M$$

and, rearranging:

$$T_1 \times V_{car_1} - T_2 \times V_{car_{1(pass)}} + V_{car_3}(T_1 - T_2) = M$$

It is assumed that the average passing speed of car No. 1 is greater than its average speed during Time$_1$, while following car No. 2. If $T_2$ is greater than $T_1$, then the first term containing $V_{car_1}$ will be negative. Likewise, the second term containing $V_{car_3}$ will be negative and the margin of safety must also be negative. If $T_1 = T_2$, the first term will be negative, the second term will equal zero, and the margin of safety will still be negative. If $T_1$ is greater than $T_2$, the polarity of the first term is uncertain; however, the second term will be positive. Therefore, a positive margin of safety indicates that the sum of the first and second terms is positive and that the second term is positive. The invention has the required information to determine both the polarity and magnitude of the first term. Although the second term is positive, the magnitude can only be approximate, as the exact speed of car No. 3 is undetermined. The main concern is that the first term may be negative with the second term being over-rated so that a false safety margin is given. If the average speed of 45 MPH is assigned to car No. 3, the term $V_{c3} (T_1 - T_2)$ can be over-rated only if the actual speed of car No. 3 is less than 45 MPH. If the margin of safety is quite small and the car appears to be traveling at a slow speed, the instructor may choose to discount the results of the test. As the average car will normally be traveling in the speed range of 50 – 70 MPH, the margin of safety as indicated by this test will be conservative, as is desired.

The main function switch 143 is turned to the "passing" position. Switch contact 124 grounds the non-inverting input of amplifier 94, which prevents the energizing of relay windings 90 and 98 and the switching of any of their corresponding relay contacts. Switch contact 27 disconnects the input from the brake light, thereby preventing the energizing of relay winding 28 and the switching of any of its contacts. Switch contact 26 grounds line 140, disabling the circuits of FIG. 2.

When the instructor depresses the start-passing-test switch, switch contact 35 grounds—via line 139 and contact 1 of main function switch—an input to NAND gate 2, which in turn energizes relay winding 6. Relay contacts 8 and 9 open, allowing their respective integrating circuits to operate in a normal manner. Start-passing-test switch contact 36 grounds an input to NAND gate 40, driving its output high, thereby placing a high at one input of NAND gate 39. The other input of NAND gate 39 is normally held high by plus 5 volts through resistor 38. With both inputs high, the output of NAND gate 39 is held low, providing a second low input to NAND gate 40, thereby ensuring that its output will remain high. The high output of NAND gate 40 is connected via resistor 41 to transistor 42, which then energizes relay winding 43 and lowers relay contact 44.

The negative speed voltage developed at the output of amplifier 81 is conducted through input resistor 45, relay contact 44, line 134, main function switch contact 129, and line 133 to the input of amplifier 18, where it is integrated, forming a distance. Resistor 45 is selected to form with capacitor 19 the proper time constant for the passing distance scale of meter 20. A negative reference voltage is also applied to the input of amplifier 18 via resistor 46, which is selected to provide the desired speed of car No. 3.

Block 34 represents a means of determining when car No. 3 passes by car No. 1. This may be accomplished by sensing the reflection of a radio frequency signal transmitted and received by special antennas externally placed on the driver's side of the car. When car No. 3 passes by, the output of block 34 provides the input of NAND gate 39 with a momentarily low input. A low at an input of NAND gate 39 forces its output to go high, supplying NAND gate 40 with a high input. Since the other input is held high via resistor 37 to plus 5 volts, the output of NAND gate 40 goes low, turning off transistor 42 and relay winding 43. Relay contact 44 moves upward, disconnecting resistors 45 and 46, thereby terminating the integration of the speed voltages of cars No. 1 and No. 3. The voltage at the output of amplifier 18 then represents the sum of the actual distance traveled by car No. 1 from the start of the test to the passing by of car No. 3, and the distance car No. 3 would travel during the same period if its average speed equaled the speed assigned to car No. 3 by the apparatus.

When the passing test is started by depressing the start-passing-test switch, switch contact 128 momentarily grounds an input of NAND gate 65, whose output then applies a high to the input of NAND gate 64. As the student is not using his signal lights at the time the test is started, the left front signal lamp is not lighted and the input from said lamp will be low. Said low is applied at the input of inverter 63 via resistor 58. The output of the inverter then applies a second high input to NAND gate 64, assuring that the output of said NAND gate will then hold transistor 69 and relay winding 70 off. The same output also supplies a low input to NAND gate 65, ensuring that the output of the two NAND gates will remain in a stable state after the start-passing-test switch is released.

As the student starts to pass, he signals his moving into the passing lane with his left signal light. As said signal light goes on, a positive voltage is applied through resistor 58 to the input of inverter 63. Diode 59 is a clamping diode which holds the input of inverter 63 within a safe limit. The output of said inverter provides NAND gate 64 with a low input, thereby providing a high output which is conducted via line 66 through resistor 68 to the base of transistor 69. Said transistor then conducts, energizing relay winding 70, thereby lowering the relay's contacts.

Relay contact 72 switches, grounding the positive output of generator 73, while the negative output of said generator is switched to line 145, thereby presenting a negative speed voltage on said line. Relay winding 71 closes, providing passage of the negative speed voltage through input resistor 116, said relay contact, line 136, main function switch contact 126, and relay contact 33 to the input of amplifier 12, Resistor 116 forms with capacitor 13 the proper time constant so that as the negative speed voltage of car No. 1 is integrated by the circuit of amplifier 12, the output of said amplifier produces, on a scale of meter 14, the instantaneous distance traveled by car No. 1 since the closing of relay contact 71. Relay contact 75 closes, connecting the output of amplifier 81, which is now positive, via input resistor 77, relay contacts 75 and 44, switch contact 129, to the input of amplifier 18. A positive reference voltage is also applied to the input of amplifier 18 via resistor 76, which is selected to provide the desired speed of car No. 3. As the output of amplifier 81 is, for any given speed of car No. 1, equal though opposite to its output during the first part of the test, resistor 77 is equal in value to resistor 45. If the plus reference voltage is equal to the negative reference voltage, then resistor 76 is also equal in value to resistor 46. Therefore, when relay contact 75 closes, the speed voltage of cars No. 1 and No. 3, upon being integrated by the circuit of amplifier 18, subtracts a distance equal to the distances traveled by said cars while car No. 1 is actually passing car No. 2.

After car No. 2 has been passed, the student is instructed to signal entry into the right lane by using the right signal light. Once he is safely in the right lane, the signal light is turned off, ending the test.

When the apparatus was first turned on prior to the start of the passing test, signal lamp feed 52 was high while right front signal lamp lead 48 was low, applying a low via resistor 47 to inverter 53. Therefore, the output of inverter 53 provided a high input to NAND gates 55 and 56. A second high input was applied to NAND gate 55 by the high input at lead 52, which is clamped at an allowable value by the resistor 51 diode 50 combination. Therefore, the output of NAND gate 55 was low and applied a low input to NAND gate 57. The output of NAND gate 57 then went high, applying a high input to NAND gate 57. As NAND gate 56 had a second high input from the output of inverter 53, its output was maintained low, thereby providing NAND gate 57 with a low input. When the left signal light was used at the start of passing, lead 52 went low, providing a high input to NAND gate 57; but since the other input was low, there was no change in the outputs of NAND gates 56 and 57.

When the right signal light is used as the student pulls back into the right lane, a positive input through resistor 47 applies a high, which is clamped by diode 49 at an allowable value, to inverter 53 whose output then applies a low input to NAND gates 55 and 56. The low on NAND gate 55 drives its output high, providing a high input to NAND gate 57. At the same time the low input of NAND gate 56 causes its output to go high, thereby applying a second high to NAND gate 57. As the output of NAND gate 57 goes low, it applies a low to the input of NAND gate 56, thereby switching the output state of the flip-flop NAND gate pair. When the output of NAND gate 56 goes high, it is coupled via capacitor 60 to the input of NAND gate 65, which is already high by connection through resistor 62 to plus 5 volts. Clamping diode 61 prevents the input voltage from becoming excessive.

While the turn signal switch is on, the signal lamp feed and the right front signal lamp are connected by said switch; therefore, they are both alternately high and low while the lamp is flashing on and off. If the inputs are low, lead 52 via resistor 51 applies a low to the input of NAND gate 55. When the inputs are high, the output of inverter 53 applies a low to said NAND gate. Therefore, the output of NAND gate 55 remains high with no change in the flip-flop pair of NAND gates 56 and 57. Capacitor 54 with resistor 51 provides a time delay equal to the propagation delay of inverter 53, thereby ensuring that the above switching of the inputs is simultaneous.

When the signal light is turned off at the end of the test, a low input on lead 48 will provide NAND gates 55 and 56 with a high input. Lead 52, being disconnected from the signal lights, becomes high and applies a second high to NAND gate 55, which then switches its output low, causing the output of NAND gate 57 to go high. This places a second high input on NAND gate 56, thereby forcing its output to go low. Said output then applies a negative pulse through capacitor 60, lowering an input to NAND gate 65, which then drives the output of NAND gate 65 high, applying a high input to NAND gate 64. As the input to inverter 63 is low when the left front signal lamp is off, its output is high, applying a second high to the input of NAND gate 64, thereby switching the output of said gate low, turning off transistor 69 and relay winding 70, which then raises its relay contacts. The opening of relay contact 75 then terminates the input to amplifier 18; therefore, its output will hold at the voltage equal to the difference between the first total distance and the second total distance, which is by definition the margin-of-safety distance. Relay contact 71 also switches, opening the input to integrating amplifier 12. This holds its output at a voltage equal to the distance traveled by car No. 1 while passing car No. 2.

After the distances are noted, the reset switch may be depressed, resetting the circuits of amplifiers 12 and 18 so that a new test can be run.

Voltage comparator 21, which is an operational amplifier, is biased by adjustment of potentioneter 22 so that the output of amplifier 21 will be negative for zero or any positive voltage at the inverting input of said amplifier. If while car No. 1 is passing car No. 2 the distance traveled by cars No. 1 and No. 3 becomes greater than the original distance between cars No. 1 and No. 3, the output of amplifier 18 goes negative This provides a negative input to amplifier 21, via resistor 270, which drives the output of said amplifier to a positive saturation voltage of about plus 13 volts. The positive output passes through resistor 23 to the base of transistor 25, which then conducts, supplying a positive voltage through diode 147, which then energizes buzzer 31. This indicates that a crash would have occurred had the student attempted to pass at the same rate of speed when car No. 3 was at its original distance.

The invention should not be limited to the particular circuit configuration shown, nor to any of the particular voltages, which are merely used as illustrative examples. What is important is to provide an electrical means, simple in construction, to indicate the various distances desired.

I claim:

1. In a driver training and testing apparatus adapted for use with an automobile, driven by a student,
   means for developing an electrical signal representative of the velocity of said automobile,
   integrating means for converting said electrical signal into a voltage proportional to a distance traveled by said automobile,
   means for indicating said distance, and
   braking stimuli means interconnected with said integrating means, said braking stimuli means comprising two sets of stimuli so interconnected that said student must be aware of both sets of stimuli.

2. The structure of claim 1 further characterized in that said indicated distance is a braking reaction distance.

3. The structure of claim 1 further characterized in that said indicated distance is a stopping distance.

4. In a driver training and testing apparatus adapted for use with an automobile, driven by a student,
   means for developing an electrical signal representative of the velocity of said automobile,
   integrating means for converting said electrical signal into a voltage proportional to a distance traveled by said automobile,
   means for indicating said distance,
   means for selecting various simulated road conditions, and means for sensing braking actions, performed by said student, not compatible with said various simulated road conditions.

5. The structure of claim 4 further characterized in that said indicated distance is a stopping distance.

6. The structure of claim 4 further characterized by means for providing a simulated skid while braking.

7. The structure of claim 6 further characterized by means of providing a warning when said simulated skid occurs.

8. The structure of claim 4 further characterized in that said means for selecting various road conditions includes means for selecting various maximum deceleration rates.

9. The structure of claim 8 further characterized by means for simulating a skid, said skid occurring whenever said automobile's deceleration rate is greater than said selected maximum deceleration rate.

10. In a driver training and testing apparatus adapted for use with an automobile, driven by a student, means for developing an electrical signal representative of the velocity of said automobile, integrating means for converting said electrical signal into a voltage proportional to a distance traveled by said automobile, means for indicating said distance, means for calculating a first distance representative of a distance between said automobile and an oncoming vehicle, means for calculating a second distance representative of the sum of the distances traveled by said automobile and said oncoming vehicle, while said automobile is passing a moving vehicle, and means for subtracting said second distance from said first distance, with the difference representing a margin-of-safety distance.

11. The structure of claim 10 further characterized by means for indicating a collision if said second distance is greater than said first distance.

* * * * *